United States Patent
Chou et al.

(10) Patent No.: US 9,554,403 B2
(45) Date of Patent: Jan. 24, 2017

(54) SELECTING A RADIO NODE FOR DATA TRAFFIC OFFLOADING

(71) Applicant: INTEL IP CORPORATION, Santa Clara, CA (US)

(72) Inventors: Joey Chou, Scottsdale, AZ (US); Sasha Sirotkin, Petach Tikva (IL); Muthaiah Venkatachalam, Beaverton, OR (US)

(73) Assignee: INTEL IP CORPORATION, Santa Clara, UT (US)

( * ) Notice: Subject to any disclaimer, the term of this patent is extended or adjusted under 35 U.S.C. 154(b) by 133 days.

(21) Appl. No.: 14/338,638

(22) Filed: Jul. 23, 2014

(65) Prior Publication Data

US 2015/0029879 A1 Jan. 29, 2015

Related U.S. Application Data

(60) Provisional application No. 61/859,121, filed on Jul. 26, 2013.

(51) Int. Cl.
*H04W 4/00* (2009.01)
*H04W 76/02* (2009.01)
(Continued)

(52) U.S. Cl.
CPC .......... *H04W 76/02* (2013.01); *H04J 11/0023* (2013.01); *H04L 5/14* (2013.01); *H04L 69/16* (2013.01); *H04W 4/005* (2013.01); *H04W 16/28* (2013.01); *H04W 24/02* (2013.01); *H04W 24/08* (2013.01); *H04W 24/10* (2013.01); *H04W 36/0066* (2013.01); *H04W 36/0083* (2013.01); *H04W 36/30* (2013.01); *H04W 52/0209* (2013.01); *H04W 72/0413* (2013.01); *H04W 72/082* (2013.01); *H04W 74/0833* (2013.01); *H04W 76/021* (2013.01);
(Continued)

(58) Field of Classification Search
CPC ....... H04J 11/0023; H04L 5/0007; H04L 5/14; H04L 69/16; H04W 16/28; H04W 24/02; H04W 24/08; H04W 36/0066; H04W 36/0083; H04W 4/005; H04W 52/0209; H04W 72/0413; H04W 72/082; H04W 74/0833
USPC ............ 370/276, 277, 281, 293, 295, 310.2, 370/328–333, 338, 341, 343, 345, 431, 370/436–437, 442, 480–482; 455/436, 455/447, 450, 451, 452.1, 464
See application file for complete search history.

(56) References Cited

U.S. PATENT DOCUMENTS

| | | | | |
|---|---|---|---|---|
| 2011/0116385 A1* | 5/2011 | Turlington | .......... | H04L 12/4633 370/242 |
| 2012/0023189 A1* | 1/2012 | Giaretta | ................ | H04W 48/18 709/217 |

(Continued)

*Primary Examiner* — Mohamed Kamara
(74) *Attorney, Agent, or Firm* — Thorpe North & Western

(57) ABSTRACT

A technology that is operable to select a radio node on a communications network is disclosed. In one embodiment, a user equipment (UE) is configured with circuitry configured to determine when to offload data traffic of the UE to a wireless local area network (WLAN) access point (AP) in a multi-radio access technology (RAT) communications network based on radio access network (RAN) assistance information communicated via the operations, administration and maintenance (OAM) system. A status is identified of one or more WLAN APs in the multi-RAT communications network using the RAN assistance information. A radio node is selected in the cell of the multi-RAT communications network for communication based on selected criteria.

25 Claims, 14 Drawing Sheets

(51) Int. Cl.

| | | |
|---|---|---|
| *H04W 52/02* | (2009.01) | |
| *H04L 5/14* | (2006.01) | |
| *H04W 76/04* | (2009.01) | |
| *H04W 36/00* | (2009.01) | |
| *H04W 24/08* | (2009.01) | |
| *H04W 72/08* | (2009.01) | |
| *H04W 72/04* | (2009.01) | |
| *H04W 74/08* | (2009.01) | |
| *H04L 29/06* | (2006.01) | |
| *H04W 24/02* | (2009.01) | |
| *H04W 16/28* | (2009.01) | |
| *H04J 11/00* | (2006.01) | |
| *H04W 24/10* | (2009.01) | |
| *H04W 36/30* | (2009.01) | |
| *H04W 84/12* | (2009.01) | |
| *H04W 88/06* | (2009.01) | |
| *H04W 88/08* | (2009.01) | |
| *H04L 5/00* | (2006.01) | |
| *H04W 84/18* | (2009.01) | |

(52) U.S. Cl.
CPC ....... *H04W 76/023* (2013.01); *H04W 76/046* (2013.01); *H04L 5/0007* (2013.01); *H04W 84/12* (2013.01); *H04W 84/18* (2013.01); *H04W 88/06* (2013.01); *H04W 88/08* (2013.01); *Y02B 60/50* (2013.01)

(56) References Cited

U.S. PATENT DOCUMENTS

| | | | | |
|---|---|---|---|---|
| 2012/0230191 | A1* | 9/2012 | Fang | H04W 36/22 370/235 |
| 2012/0269134 | A1* | 10/2012 | Jin | H04W 28/085 370/328 |
| 2013/0242783 | A1* | 9/2013 | Horn | H04W 24/10 370/252 |
| 2013/0286826 | A1* | 10/2013 | Park | H04W 28/08 370/230 |
| 2014/0162629 | A1* | 6/2014 | Tipton | H04W 24/02 455/423 |
| 2014/0204802 | A1* | 7/2014 | Han | H04W 48/16 370/255 |

* cited by examiner

| WLAN AP | WLAN AP identifier | MAC and PHY Spec | Radio parameters | WLAN AP state | WLAN AP location | WLAN AP traffic load |
|---|---|---|---|---|---|---|
| AP #1 | | | | | | |
| AP #2 | | | | | | |
| AP #3 | | | | | | |
| AP #4 | | | | | | |
| AP #5 | | | | | | |

FIG. 5

SELECTING A RADIO NODE FOR DATA TRAFFIC OFFLOADING

RELATED APPLICATIONS

This application claims the benefit of and hereby incorporates by reference U.S. Provisional Patent Application Ser. No. 61/859,121, filed Jul. 26, 2013.

BACKGROUND

Data usage and demand for a data delivery capacity of communications networks continue to rise with an increasing popularity of mobile devices, such as mobile phones, tablet devices, laptops, and so forth. With the increase in data usage and data delivery capacity demand, communications network operators and providers are experiencing cellular network congestion. To meet the increasing demand for bandwidth in communications networks, communications network operators and providers may use multiple radio access technologies (multi-RATs), such as cellular networks and wireless networks, to transfer data in the communications network.

Wireless networks use an unlicensed portion of the communications spectrum, and wireless network nodes can be widely deployed at relatively low cost. With widespread and cost effective deployments of wireless network technologies (such as Wi-Fi networks) available, communications network operators and providers can offload data traffic to the wireless networks to decrease cellular network congestion. For example, as smartphones are being equipped with both cellular network connecting capabilities and wireless network connecting capabilities, communications network operators and providers may offload cellular network data to the wireless networks. Accordingly, there is a need for a communications scheme for communications networks that can use cellular networks and wireless networks effectively.

BRIEF DESCRIPTION OF THE DRAWINGS

Features and advantages of the disclosure will be apparent from the detailed description which follows, taken in conjunction with the accompanying drawings, which together illustrate, by way of example, features of the disclosure; and, wherein:

FIG. 5 shows a table of underlaid WLAN AP information for a plurality of WLAN APs within a coverage area of an eNode B in accordance with an example;

Figure 1:
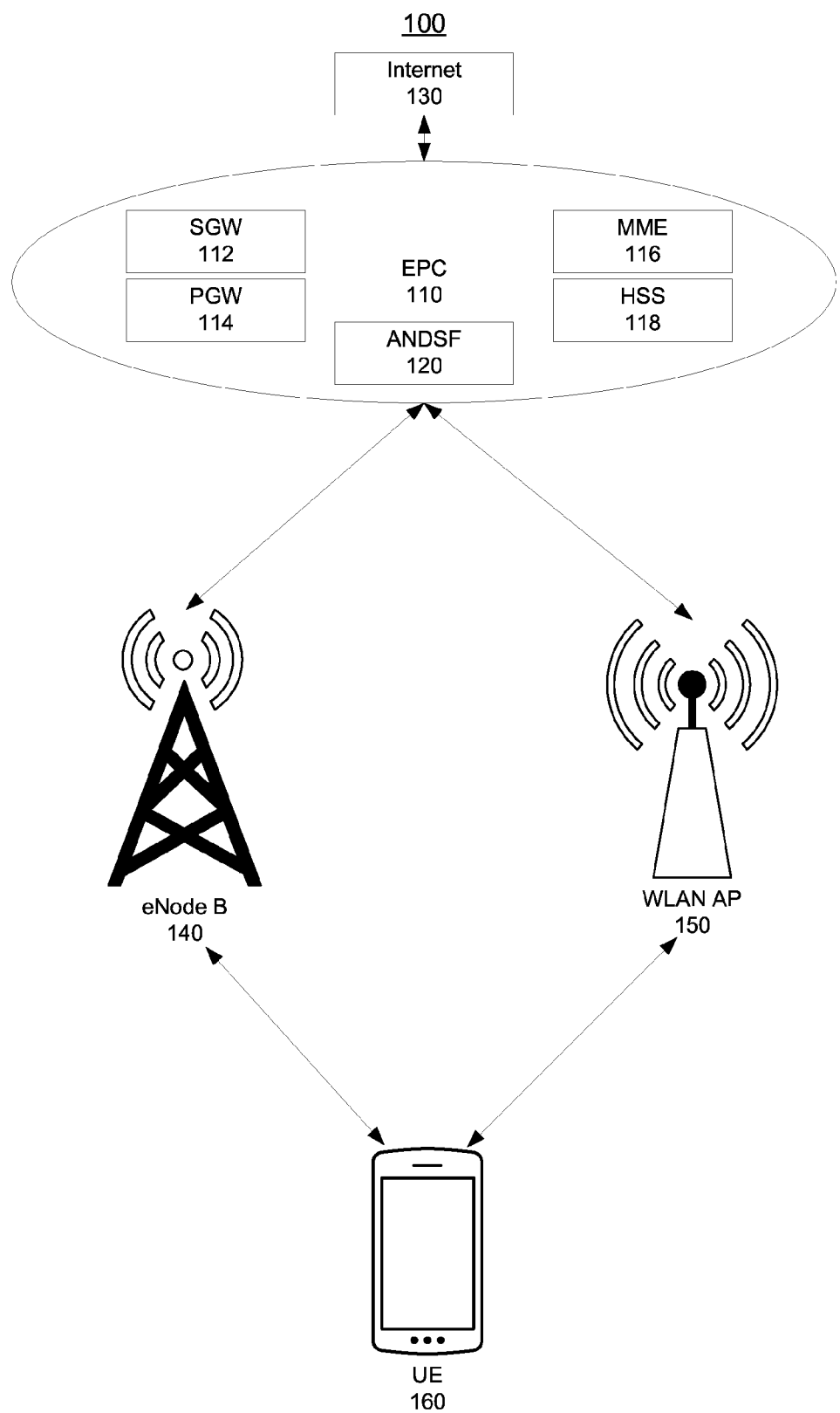
FIG. 1 depicts a communications network for radio node selection in accordance with an example.

Reference will now be made to the exemplary embodiments illustrated, and specific language will be used herein to describe the same. It will nevertheless be understood that no limitation of the scope of the invention is thereby intended.

DETAILED DESCRIPTION

Before the present invention is disclosed and described, it is to be understood that this invention is not limited to the particular structures, process steps, or materials disclosed herein, but is extended to equivalents thereof as would be recognized by those ordinarily skilled in the relevant arts. It should also be understood that terminology employed herein is used for the purpose of describing particular examples only and is not intended to be limiting. The same reference numerals in different drawings represent the same element. Numbers provided in flow charts and processes are provided for clarity in illustrating steps and operations and do not necessarily indicate a particular order or sequence.

With an increasing demand for bandwidth of communications networks because of an increased use of mobile devices and expanding data consuming applications of mobile devices, communications network operators and providers can use communications schemes with multiple radio access technologies (multi-RAT), such as cellular network technologies and wireless network technologies, to transfer data in the communications network.

In one embodiment, the cellular network can be configured to operate based on a cellular standard, such as the third generation partnership projection (3GPP) long term evolution (LTE) Rel. 8, 9, 10, 11, or 12 standard, or the institute of electronic and electrical engineers (IEEE) 802.16p, 802.16n, 802.16m-2011, 802.16h-2010, 802.16j-2009, or 802.16-2009 standard. The wireless network (such as a wireless fidelity network (Wi-Fi)) can be configured to operate using a standard such as the IEEE 802.11-2012, IEEE 802.11ac, or IEEE 802.11ad standard, or another type of wireless standard using an unlicensed band of the communications spectrum.

In one communications scheme, multi-RATs can be used for offloading data traffic from a cellular network to a wireless network, e.g. wireless local area network (WLAN)

offloading. WLAN offloading can be used to decrease or mitigate data and bandwidth congestion issues of a communications network. In one WLAN offloading scheme, a WLAN can interwork with a wireless wide area network (WWAN), such as a third generation partnership project (3GPP) cellular network, at a core network (CN) level or an evolved packet core (EPC) level. In another WLAN offloading scheme, a WLAN can interwork with a WWAN at the radio access network (RAN) level, such as a RAN2 level.

In one configuration of WLAN offloading, a UE centric WLAN offloading scheme can be used. In one embodiment of the UE centric WLAN offloading, a UE can select a radio node, such as a WLAN node or a WWAN node, to direct data traffic of the UE in the communications network. In another embodiment of the UE centric WLAN offloading, an access network discovery and selection function (ANDSF) can select a radio node to direct data traffic of the UE in the communications network.

FIG. 1 illustrates a communications network operable to select a radio node for communicating data with a UE. In one embodiment, the communications network can include an evolved packet core (EPC) 110 with a communications link to an internet connection 130 and a communications link to an evolved node B (eNode B) 140 and/or a WLAN AP 150. In another embodiment, the EPC can communicate data to a UE 160 via the eNode B and/or the WLAN AP. In one configuration, the EPC can include a serving gateway (SGW) 112, a packet data network (PDN) gateway (PGW) 114, a mobility management entity (MME) 116, a home subscriber server (HSS) 118, and/or an access network discovery and selection function (ANDSF) module 120.

In one configuration of the UE centric WLAN offloading, a RAN can provide RAN assistance information to the UE through broadcast signaling and/or dedicated signaling. In one example, the UE can use the RAN assistance information, WLAN measurements and WLAN information provided by a WLAN, and/or offload policies to select a WLAN AP to steer data traffic to. In one embodiment, the WLAN measurements can include reference signal received power (RSRP) information and reference signal received quality (RSRQ) information received by the UE. In another embodiment, the WLAN information can include the information, such as basis service set (BSS) load information, broadcasted by the WLAN AP. In one example, the BSS load information can indicate a load of the WLAN AP. In one embodiment the offload policies can be obtained: via the ANDSF; via an open mobile alliance device management (OMA-DM) procedure; and/or via a pre-configured offload policy at the UE.

In one example, when no WLAN APs are available in a cell of the communications network or all of the WLAN APs in the cell are congested, then the eNode B may not broadcast RAN assistance information. In this example, when the UE has not received the RAN assistance information, the UE can determine not to offload data traffic to a WLAN AP. In one embodiment, the UE can offload data traffic to the WLAN AP only when the WLAN AP is available and not congested.

In one configuration of WLAN offloading, network centric WLAN offloading can be used. In one embodiment, network centric WLAN offloading can be where a network element in the communications network can select a radio node in the communications network for the UE to direct data traffic to. In one embodiment of network centric WLAN offloading, an eNode B can use selected WLAN AP information, such as an availability status of one or more WLAN access points (APs), to determine when to offload data traffic of a UE to a WLAN. In another embodiment, the WLAN AP information can include information for one or a plurality of the WLAN APs. In another configuration, an operations, administration and maintenance (OAM) interface or system can communicate to the eNode B the selected WLAN AP information of the one or more WLAN APs. In one example, the eNode B can steer or direct data traffic from the UE to a WLAN AP (e.g. WLAN offloading) only when an availability status of the WLAN AP is online and non-congested (e.g. not overloaded).

In one embodiment, a UE in a radio resource control (RRC) connected state or a cell dedicated channel (DCH) state can be controlled by a network element in the communications network using dedicated traffic steering commands. In one configuration, the network element can be an open mobile alliance device manager (OMA DM), an OAM network manager (NM), an eNode B, or a radio network controller (RNC). In another embodiment, the dedicated traffic steering commands can be based on WLAN measurements reported by the UE. In one example, an eNode B or a RNC can configure UE measurement procedures, such as an identity of a target WLAN to be measured, in the WLAN measurement report. In another example, when there is no network interface between the eNode B or the RNC and the WLAN AP, the WLAN identities can be configured in the eNode B or the RNC via an OAM interface. In this example, the eNode B or the RNC can select the target WLAN AP based on state or status information of the WLAN AP and/or a location of the WLAN AP.

In one embodiment, the selected WLAN AP information can be provided to the eNode B via the OAM interface. In another embodiment, the selected WLAN AP information can include: a WLAN AP identifier, such as a service set identification (SSID), a basic SSID (BSSID), a roaming consortium list according to an Institute of Electronics and Electrical Engineers (IEEE) 802.11u hotspot 2.0 (HS2.0) standard, a network address identifier (NAI) realm list according to an IEEE 802.11u HS2.0 standard, or a domain name list using fully qualified domain names (FQDN) according to an IEEE 802.11u HS2.0 standard; media access control (MAC) specifications and physical layer (PHY) specifications of the WLAN AP, such as MAC specifications and PHY specifications based on an Institute of Electronics and Electrical Engineers (IEEE) 802.11g standard, an IEEE 802.11n standard, an IEEE 802.11ac standard, an IEEE 802.11-2012 standard, or an IEEE 802.11ad standard; a radio frequency parameter, such as a frequency band or a channel band of the WLAN AP used for communicating data; state or status information of the WLAN AP, such as an online status, an offline status, coupled to an internet connection status, a congested status, or a non-congested status; a location of the WLAN AP; or traffic load information or backhaul load information of the WLAN AP, such as backhaul load information according to one or more HS2.0 wide access network (WAN) metrics.

In one embodiment, the cellular network can be a third generation (3G) cellular network. In one example, the OAM interface of the 3G cellular network can communicate an availability status of one or more WLAN APs to a radio network controller (RNC). In another example, lightweight WLAN APs can be deployed and controlled by an access controller (AC). In this example, an OAM NM can communicate the availability status of one or more WLAN APs with the AC. In another embodiment, the cellular network can be a 3GPP long term evolution (LTE) cellular network, such as 3GPP Rel. 8, Rel. 9, Rel. 10, Rel. 11, or Rel. 12.

Figure 2:
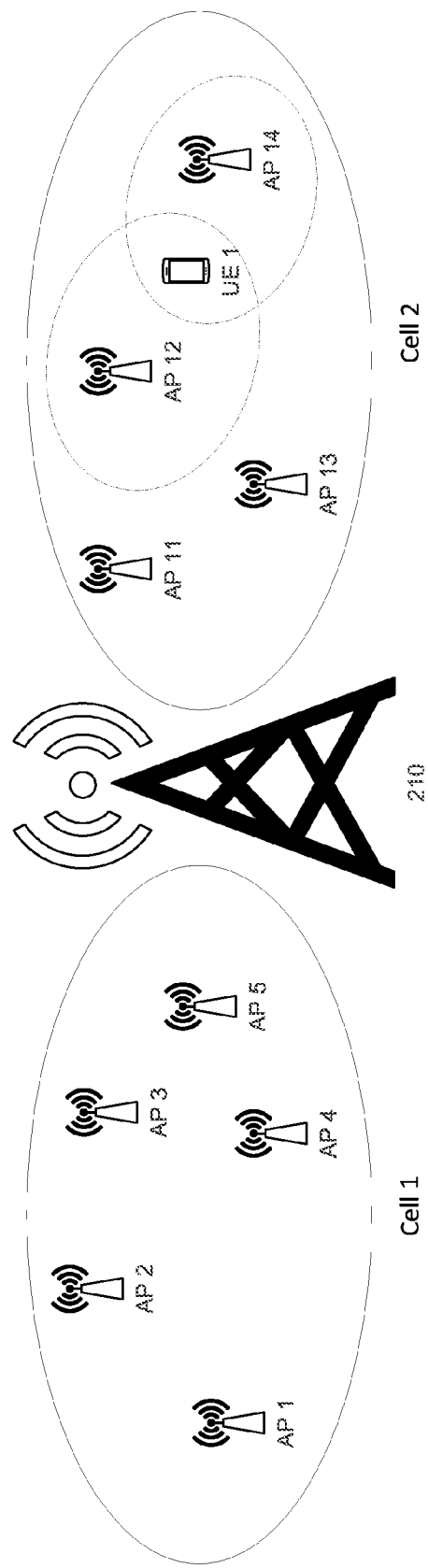
FIG. 2 depicts a communications network with an evolved node B (eNode B) and wireless local area network (WLAN) access points (APs) in cells of the eNode B in accordance with an example.

In one embodiment, for UE centric WLAN offloading and/or network centric WLAN offloading, an eNode B in the communications network can determine a number of WLAN APs within a cell coverage area of the eNode B and a state or status of each of the WLAN APs. FIG. 2 shows a communications network with an eNode B 210 and WLAN APs 1-5 and WLAN APs 11-14 in cells 1 and 2, respectively, of the eNode B 210. FIG. 2 further shows WLAN APs 1-5 are underlaid WLAN APs of cell 1 and while WLAN APs 11-14 are underlaid WLAN APs of cell 2.

Figure 3:
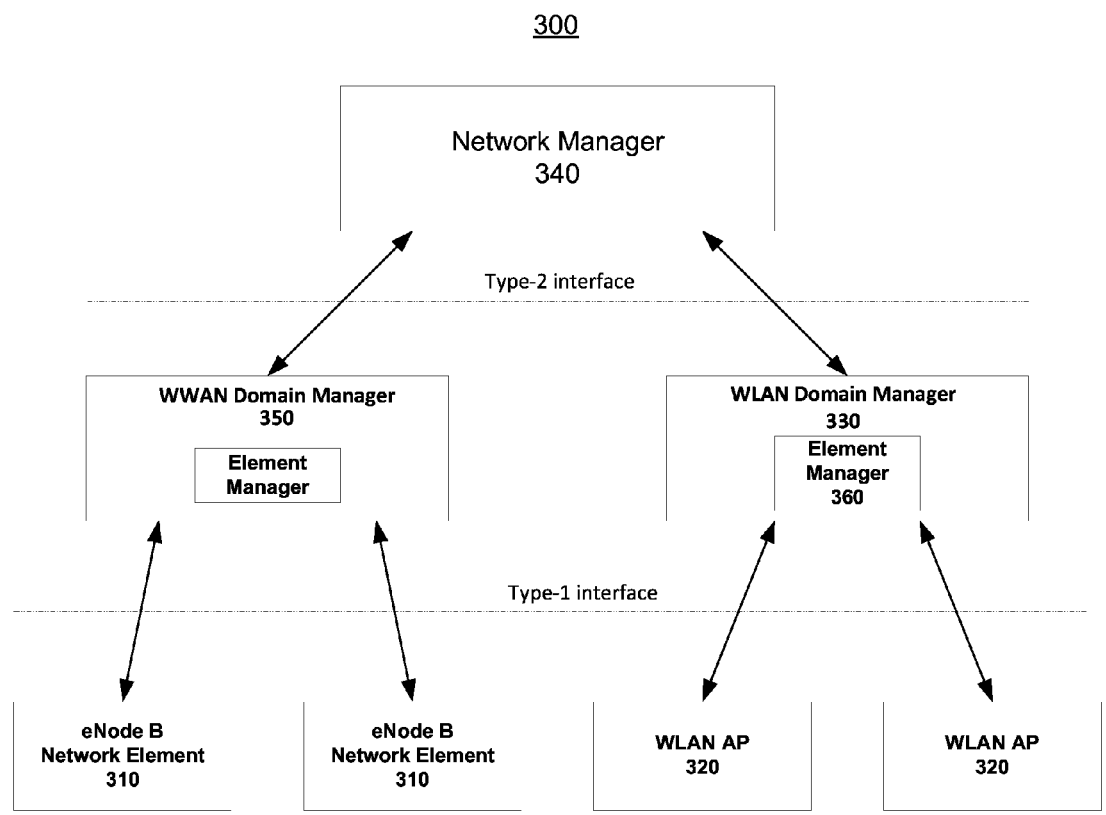
FIG. 3 depicts a diagram illustrating a wireless wide area network (WWAN) node receiving WLAN AP information for traffic offloading from a WLAN domain manager (DM) in accordance with an example.

FIG. 3 shows an OAM architecture 300 with a plurality of eNode Bs network elements (NEs) 310 and WLAN APs 320 in a cellular network. FIG. 3 further shows is a diagram illustrating the eNode Bs NEs 310 receiving WLAN AP information for traffic offloading from a WLAN domain manager (DM) 330 via a network manager (NM) 340. In one configuration, WLAN AP information for traffic offloading can be communicated between an eNode B NE 310 and the WLAN DM 330 over a control plane or a management plane, such as the NM 340. In another embodiment, the WLAN DM can be associated with a WLAN element manager (EM) 360 via the NM 340.

In one embodiment, the WLAN DM 330 can receive the WLAN AP information from a plurality of WLAN APs 320. In one example, the WLAN DM 330 can obtain WLAN AP information for a plurality of WLAN APs 320 based on a polling mechanism or trigger based reporting from the WLAN APs 320. In one example, the eNode B NE 310 can request WLAN AP information for neighboring or underlying WLAN APs 320 in the cell of the communications network from the NM 340. The eNode B NE 310 can communicate the request to the NM 340 via the WWAN DM 350. In one embodiment, the eNode B NE 310 can determine a frequency or a condition to initiate the request for the WLAN AP information from the NM 340. In one example, when the eNode B NE 310 is overloaded, the eNode B NE 310 can request WLAN AP information from the WLAN DM 330. In this example, when the eNode B NE 310 receives the WLAN AP information, the eNode B NE 310 can provide the WLAN AP information to a UE to assist the UE in selecting a WLAN AP 320 for offloading. In one configuration, the eNode B NE 310 can request WLAN AP information that is associated with a WLAN AP 320 in a particular location or cell of the communications network.

In one configuration, an eNode B NE 310 can select a WLAN AP 320 for a UE to offload data traffic to. In one embodiment, the eNode B NE 310 can request WLAN AP information for a plurality of WLAN APs 320 and use the WLAN AP information to select the WLAN AP 320 to offload the data traffic. In another embodiment, the WLAN AP information sent to each eNode B NE 310 can be based on a location of the eNode B NE 310 and/or a coverage area of the eNode B NE 310. In another embodiment, information can be communicated between the WWAN DM 350 and the NM 340 or the WLAN DM 330 and the NM 340 using a type-2 interface. In another embodiment, information can be communicated between the WWAN DM 350 and the eNode B NE 310 or the WLAN DM 330 and the WLAN AP 320 using a type-1 interface.

Figure 4:
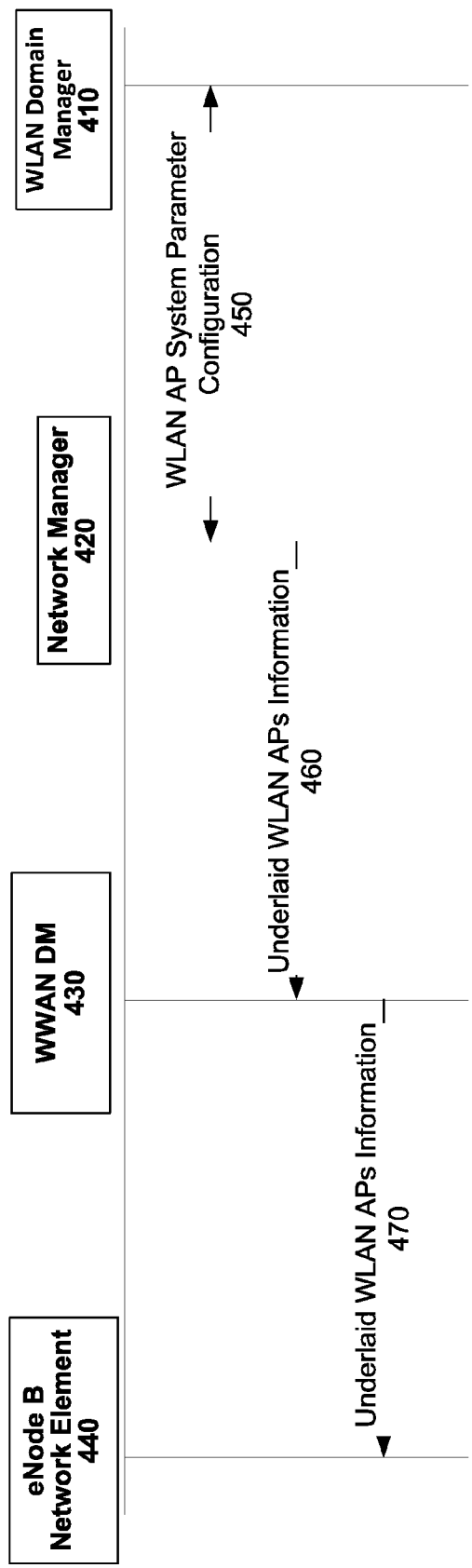
FIG. 4 depicts a flow diagram of communicating underlaid WLAN AP information to a selected eNode B in accordance with an example.

FIG. 4 shows a flow diagram for communicating underlaid WLAN AP information to a selected eNode B. In one configuration, an OAM system can provide a system architecture for an eNode B to communicate with an underlaid WLAN AP in a cell of the eNode B, as shown in FIG. 2. In one embodiment, a WLAN DM 410 can communicate a WLAN AP system parameter configuration to a NM 420, as in block 450. In another embodiment, the NM can communicate underlaid WLAN AP information of one or more WLAN APs to a WWAN DM 430, as in block 460. The WWAN DM 430 can communicate the underlaid WLAN AP information of the one or more WLAN APs to an eNode B NE 440, as in block 470.

FIG. 5 shows a table of underlaid WLAN AP information for a plurality of WLAN APs 1-5 within a coverage area of an eNode B. FIG. 5 further depicts that the WLAN AP information can include: a WLAN AP identifier; MAC specifications and PHY specifications of the WLAN AP; a radio frequency parameter; state or status information of the WLAN AP; a location of the WLAN AP; and/or traffic load information of the WLAN AP.

Figure 6:
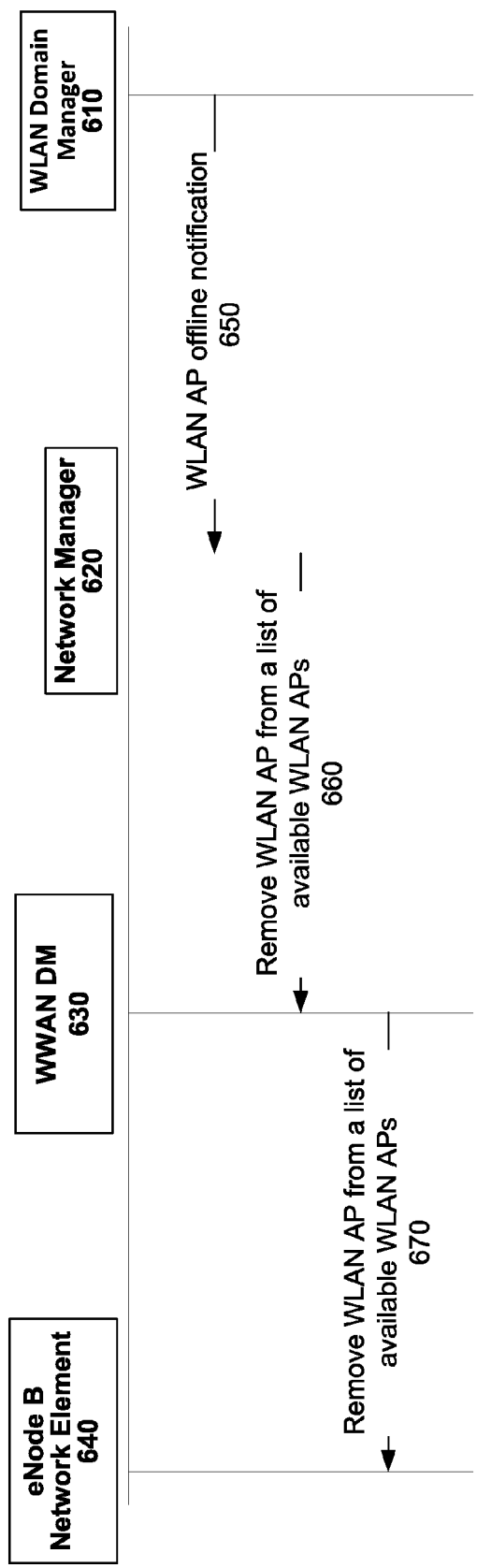
FIG. 6 depicts a flow diagram of an eNode B removing a WLAN AP that has switched to an offline status from a list of available WLAN APs in accordance with an example.

FIG. 6 shows a flow diagram of an eNode B NE 640 removing a WLAN AP that has switched to an offline status from a list of available WLAN APs. In one embodiment, a WLAN DM 610 can communicate a WLAN AP offline notification to a NM 620 indicating that a WLAN AP has switched to an offline status, as in block 650. In another embodiment, the NM can communicate a message to a WWAN DM 630 indicating to remove the WLAN AP with the offline status from a list of available WLAN APs, as in block 660. In another embodiment, the WWAN DM can communicate a message to an eNode B NE 640 indicating to remove a WLAN AP with the offline status from a list of available WLAN APs, as in block 670. In another embodiment, an OAM interface can communicate a message to the eNode B NE indicating to remove the WLAN AP that has switched to an offline status from the list of available WLAN APs.

Figure 7:
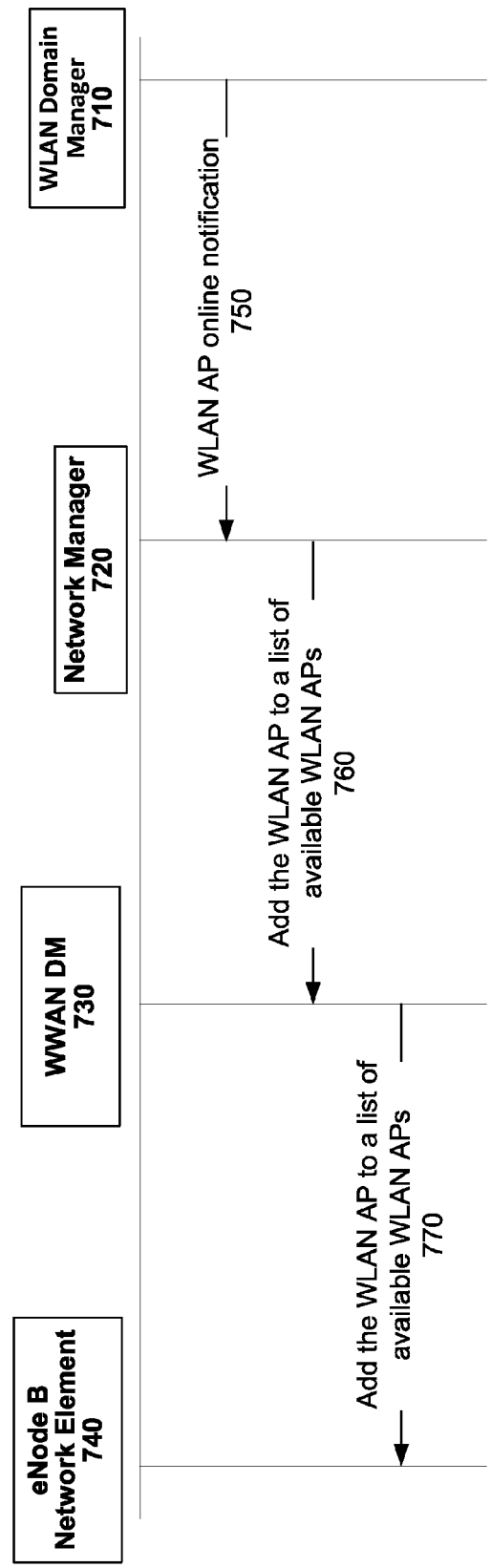
FIG. 7 depicts a flow diagram of an eNode B adding a WLAN AP that has switched to an online status to a list of available WLAN APs in accordance with an example.

FIG. 7 shows a flow diagram of an eNode B 740 adding a WLAN AP that has switched to an online status to a list of available WLAN APs. In one embodiment, a WLAN DM 710 can communicate a WLAN AP online notification to a NM 720 indicating that a WLAN AP that has switched to an online status, as in block 750. In another embodiment, the NM can communicate a message to a WWAN DM 730 indicating to add the WLAN AP with the online status to a list of available WLAN APs, as in block 760. In another embodiment, the WWAN DM can communicate a message to an eNode B NE 740 indicating to add the WLAN AP with the online status to a list of available WLAN APs, as in block 770. In another embodiment, an OAM interface can communicate a message to the eNode B indicating to add the WLAN AP that has switched to an online status to the list of available WLAN APs.

Figure 8:
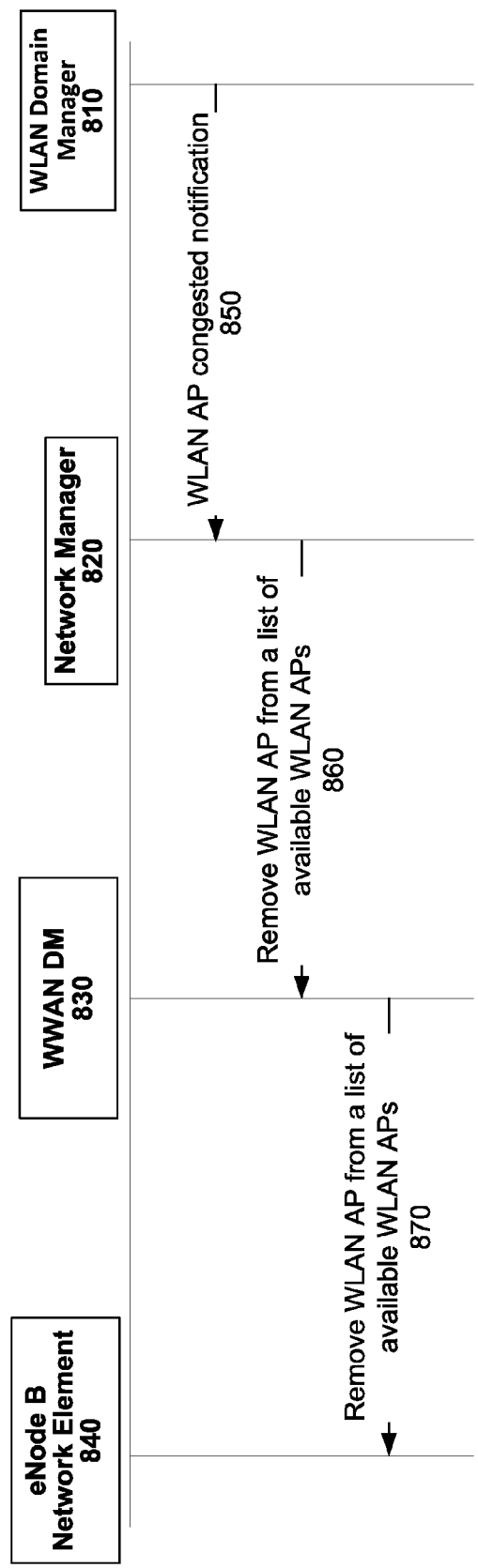
FIG. 8 depicts a flow diagram of an eNode B removing a WLAN AP that has switched to a congested status from a list of available WLAN APs in accordance with an example.

FIG. 8 shows a flow diagram of an eNode B NE 840 removing a WLAN AP that has switched to a congested status from a list of available WLAN APs. In one embodiment, the WLAN AP can switch to a congested status when a data traffic load of the WLAN AP increased above a threshold value. In another embodiment, a WLAN DM 810 can communicate a message, such as a WLAN AP congested notification, to a NM 820 indicating that a WLAN AP has switched to a congested status, as in block 850. In another embodiment, the NM can communicate a message to a WWAN DM 830 indicating to remove the WLAN AP with the congested status from a list of available WLAN APs, as in block 860. The WWAN DM can communicate a message to an eNode B NE 840 indicating to remove the WLAN AP with the congested status from a list of available WLAN APs, as in block 870. In one embodiment, an OAM interface can communicate a message to the eNode B NE indicating to remove the WLAN AP that has switched to a congested status from the list of available WLAN APs.

Figure 9:
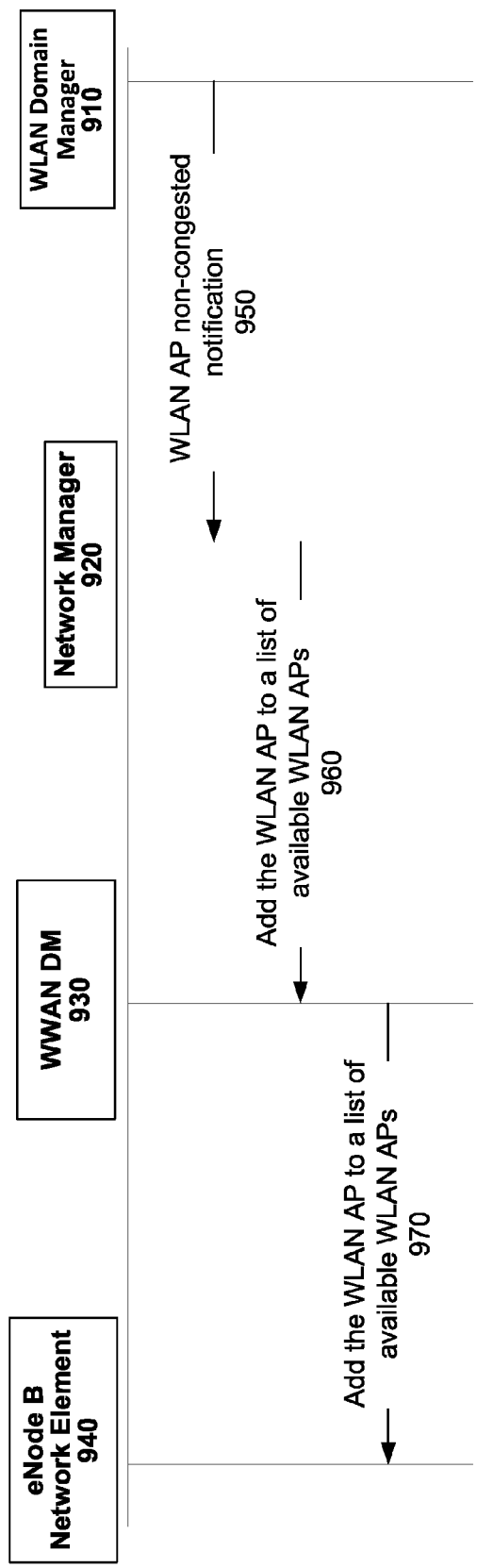
FIG. 9 depicts a flow diagram of an eNode B adding a WLAN AP that has switched to a non-congested status to a list of available WLAN APs in accordance with an example.

FIG. 9 shows a flow diagram of an eNode B NE 940 adding a WLAN AP that has switched to a non-congested status to a list of available WLAN APs. In one example, the WLAN AP can switch to a congested status when a data traffic load of the WLAN AP decreases below a threshold value. In one embodiment, a WLAN DM 910 can communicate a message, such as a WLAN AP non-congested notification, to a NM 920 indicating that a WLAN AP that has switched to a non-congested status, as in block 950. In another embodiment, the NM can communicate a message to a WWAN DM 930 indicating to add the WLAN AP with the non-congested status to a list of available WLAN APs, as in block 960. In another embodiment, the WWAN DM can communicate a message to an eNode B NE 940 indicating to add the WLAN AP with the congested status to a list of available WLAN APs, as in block 970. In one embodiment, an OAM interface can communicate a message to the eNode B NE indicating to add the WLAN AP that has switched to a non-congested status to the list of available WLAN APs.

Figure 10:
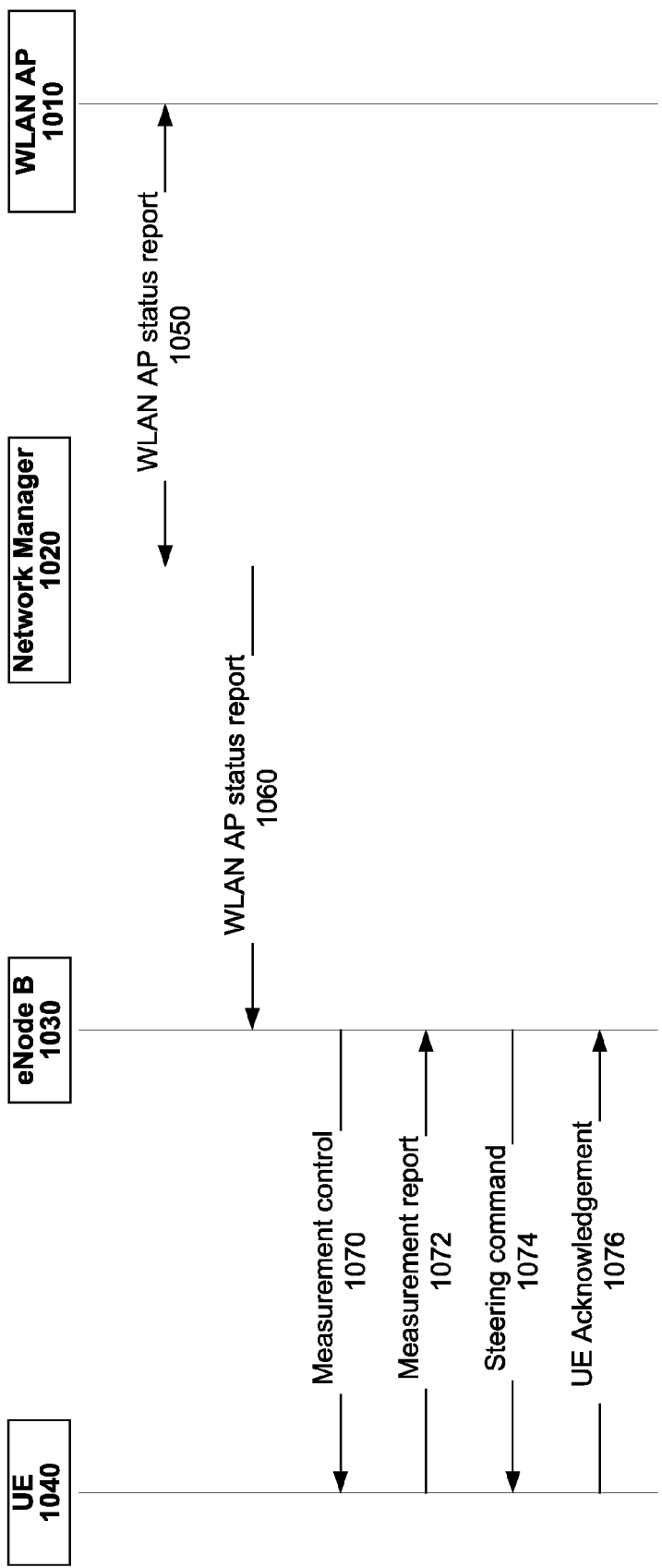
FIG. 10 depicts a flow diagram of network centric WLAN selection for data traffic offloading in accordance with an example.

FIG. 10 shows a flow diagram of network centric WLAN selection for data traffic offloading. FIG. 10 further shows an eNode B 1030 receiving a WLAN AP status report that includes state or status information of one or more WLAN APs (as discussed in the preceding paragraphs) and a location of the one or more WLAN APs. In one embodiment, a WLAN AP 1010 can communicate a WLAN AP status report to a NM 1020, as in block 1050. In another embodiment, the NM can communicate the WLAN AP status report to an eNode B, as in block 1060. In another embodiment, the eNode B can communicate a measurement control to a UE 1040, as in block 1070. In another embodiment, the UE can communicate a measurement report to the eNode B, as in block 1072. In another embodiment, the eNode B can communicate a steering command to the UE, as in block 1074. In another embodiment, the UE can send a UE acknowledgement message to the eNode B, as in block 1076. In one example, the acknowledgement message can indicate that the UE has received a steering command from the eNode B. One advantage of Wi-Fi offloading using state or status information is to improve utilization of WLAN APs when the WLAN APs are available and not congested. Another advantage of Wi-Fi offloading using state or status information is to reduce battery consumption by reducing WLAN scanning or WLAN discovery to determine when to offload data traffic of a UE to a WLAN AP.

Figure 11:
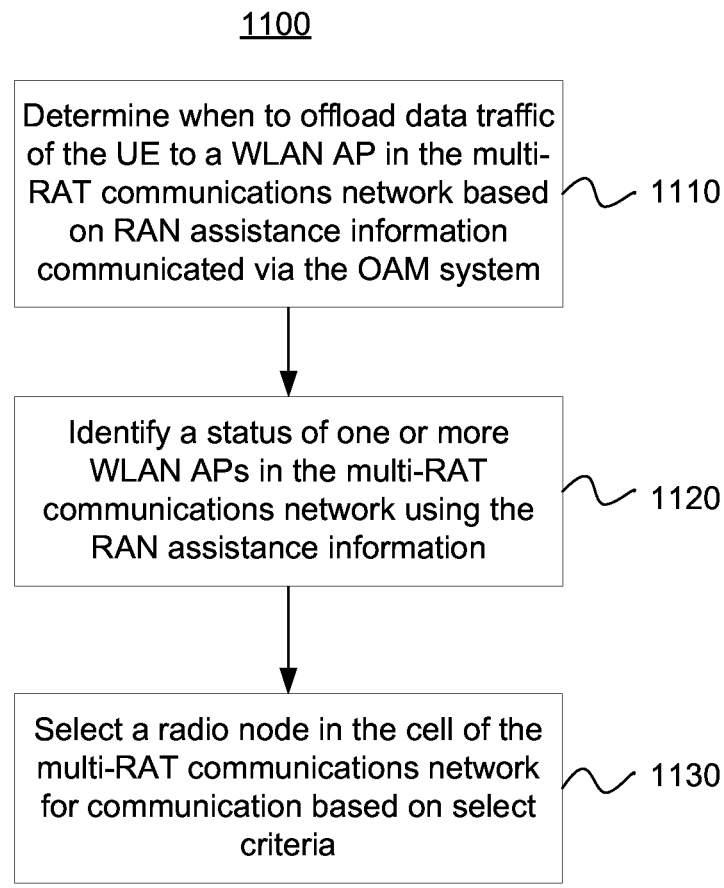
FIG. 11 depicts the functionality of circuitry of a user equipment (US) operable to select a radio node in a cell of a multiple radio access technology (multi-RAT) communications network in accordance with an example.
Figure 12:
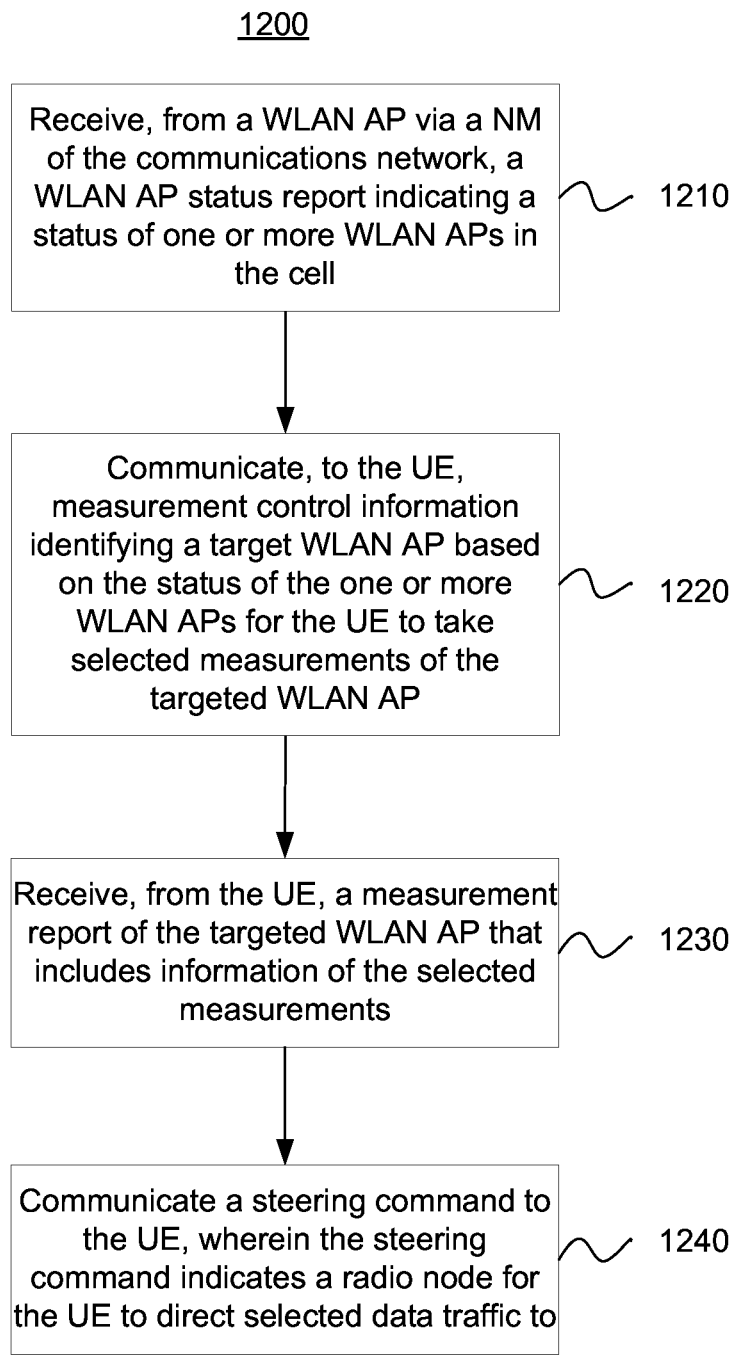
FIG. 12 depicts the functionality of circuitry of a eNode B operable to determine when a user equipment (UE) offloads data traffic to a WLAN node in a cell of a communications network in accordance with an example.

Another example provides functionality 1100 of circuitry of a user equipment (UE) operable to select a radio node in a cell of a multiple radio access technology (multi-RAT) communications network, as shown in the flow chart in FIG. 11. The functionality may be implemented as a method or the functionality may be executed as instructions on a machine, where the instructions are included on at least one computer readable medium or one non-transitory machine readable storage medium. The circuitry can be configured to determine when to offload data traffic of the UE to a wireless local area network (WLAN) access point (AP) in the multi-RAT communications network based on radio access network (RAN) assistance information communicated via the operations, administration and maintenance (OAM) system, as in block 1110. The circuitry can be further configured to identify a status of one or more WLAN APs in the multi-RAT communications network using the RAN assistance information, as in block 1120. The circuitry can be further configured select a radio node in the cell of the multi-RAT communications network for communication based on select criteria, as in block 1130.

In one embodiment, the radio node can be a wireless wide area network (WWAN) node or a WLAN AP. In another embodiment, the select criteria can be a status of the one or more WLAN APs. In another embodiment, the OAM system includes at least one of a WLAN domain manager (DM) element manager (EM), a WLAN network manager (NM), and a WWAN DM EM.

In one embodiment, the circuitry can be further configured to select a WLAN AP of the one or more WLAN APs to offload data traffic based, at least in part, on the status of the one or more WLAN APs. In another embodiment, the status of the one or more WLAN APs can be an online status, an offline status, coupled to an internet connection status, a congested status, or a non-congested status. In another embodiment, the online status of the WLAN AP can indicate that the WLAN AP is actively transmitting data or actively receiving data; and the offline status of the WLAN AP can indicate that the WLAN AP is not actively transmitting data or not actively receiving data. In another embodiment, the circuitry can be further configured to determine to offload data traffic of the UE to a selected WLAN AP when the status of the one or more WLAN APs is the online status and the non-congested status. In another embodiment, the circuitry can be further configured to: direct data traffic of the UE to a wireless wide area network (WWAN) node: when the status of the one or more WLAN APs is the offline status or the congested status; when no WLAN APs are located in the cell of the communications network; or when the UE has not received RAN assistance information from a RAN. In another embodiment, the circuitry can be further configured to select a WLAN AP of the one or more WLAN APs to offload data traffic based, at least in part, on using the RAN assistance information. In another embodiment, the circuitry can be further configured to receive RAN assistance information from a RAN via broadcast signaling or dedicated signaling. In another embodiment, the circuitry can be further configured to: receive WLAN measurements and WLAN information from the one or more WLAN APs; obtain an offload policy: from an access network discovery and selection function (ANDSF) module; via an open mobile alliance device management (OMA-DM) procedure; or pre-configured at the UE; and select a WLAN AP of the one or more WLAN APs to offload data traffic based, at least in part, on the WLAN measurements, WLAN information, and the offload policy.

Another example provides functionality 1200 of circuitry of an evolved node B (eNode B) operable to determine when a user equipment (UE) offloads data traffic to a wireless local area network (WLAN) node in a cell of a communications network, as shown in the flow chart in FIG. 1200. The functionality may be implemented as a method or the functionality may be executed as instructions on a machine, where the instructions are included on at least one computer readable medium or one non-transitory machine readable storage medium. The circuitry can be configured to receive, from a WLAN access point (AP) via a network manager (NM) of the communications network, a WLAN AP status report indicating a status of one or more WLAN APs in the cell, as in block 1210. The circuitry can be further configured to communicate, to the UE, measurement control information identifying a target WLAN AP based on the status of the one or more WLAN APs for the UE to take selected measurements of the targeted WLAN AP, as in block 1220. The circuitry can be further configured to receive, from the UE, a measurement report of the targeted WLAN AP that includes information of the selected measurements, as in block 1230. The circuitry can be further configured to communicate a steering command to the UE, wherein the steering command indicates a radio node for the UE to direct selected data traffic to, as in block 1240.

In one embodiment, the radio node can be a wireless wide area network (WWAN) node or a WLAN AP. In another embodiment, the steering command can be based on the measurement report from the UE. In another embodiment, the circuitry can be further configured to: receive WLAN AP information from an operations, administration and maintenance (OAM) interface; and determine an availability of one or more WLAN APs using the WLAN AP information of each of the one or more WLAN APs.

In one embodiment, the WLAN AP information includes an identifier of the WLAN AP, media access control (MAC) specifications and physical layer (PHY) specifications of the WLAN AP, a radio frequency parameter of the WLAN AP, state information of the WLAN AP, a location of the WLAN AP, or traffic load information of the WLAN AP. In another embodiment, the identifier of the WLAN AP can be a service set identification (SSID), a basic SSID (BSSID), a roaming consortium list according to an Institute of Electronics and Electrical Engineers (IEEE) 802.11u hotspot 2.0 (HS2.0) standard, a network address identifier (NAI) realm list according to an IEEE 802.11u HS2.0 standard, or a domain name list using fully qualified domain names (FQDN) according to an IEEE 802.11u HS2.0 standard. In another embodiment, the radio frequency parameter of the WLAN AP can be a frequency band or a channel band of the WLAN AP used for communicating data. In another embodiment, the circuitry can be further configured to determine a number of WLAN APs within the cell of a communications network and compile a list of WLAN APs available for offloading in the cell of the communications network In one embodiment, the circuitry can be further configured to: remove a selected WLAN AP from the list of available WLAN APs when the status of the selected WLAN AP changes to an offline status; remove the selected WLAN AP from the list of available WLAN APs when the status of the selected WLAN AP changes to a congested status; add a WLAN AP to the list of available WLAN APs when the status of the selected WLAN AP changes to an online status; and add a WLAN AP to the list of available WLAN APs when the status of the selected WLAN AP changes to a non-congested status. In another embodiment, the circuitry can be further configured to identify the targeted WLAN AP for the UE to take selected measurements based on a status of the one or more WLAN APs.

Figure 13:
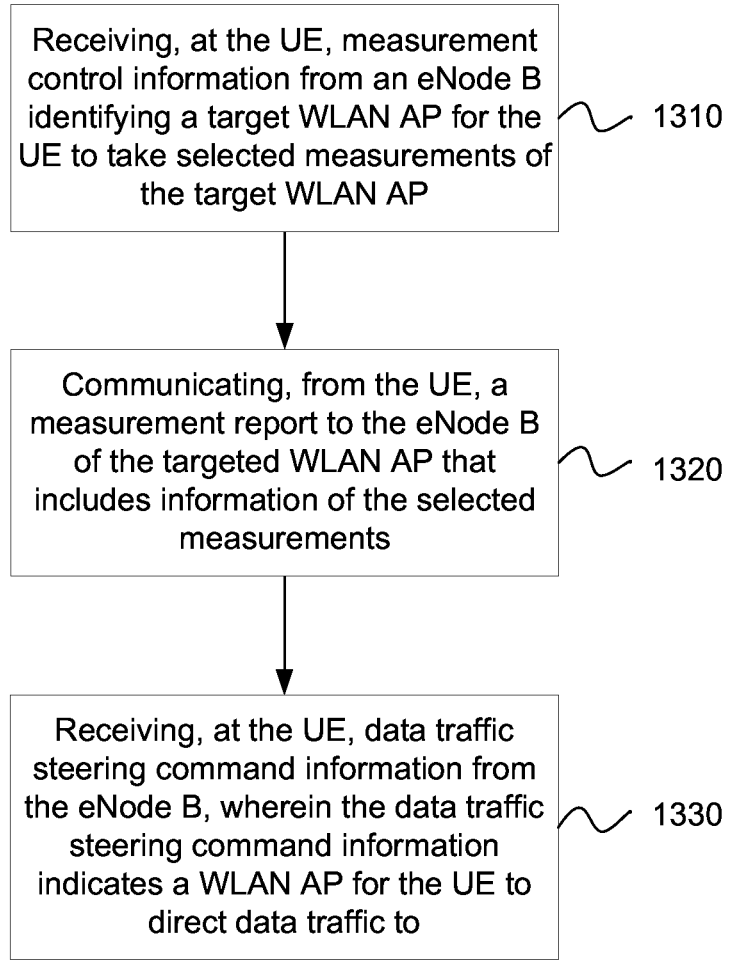
FIG. 13 depicts a product including a non-transitory storage medium having stored thereon instructions that are adapted to be executed to implement a method of selecting a WLAN AP in a communications network to offload data traffic of a UE in accordance with an example.

Another example provides functionality 1300 of product including a non-transitory storage medium having stored thereon instructions that are adapted to be executed to implement a method of selecting a wireless local access network (WLAN) access point (AP) in a communications network to offload data traffic of a user equipment (UE), as in the flow chart in FIG. 13. The instructions of the product can be implemented as a method or as instructions on a machine, where the instructions are included on at least one computer readable medium or one non-transitory machine readable storage medium. The method can comprise receiving, at the UE, measurement control information from an evolved node B (eNode B) identifying a target WLAN AP for the UE to take selected measurements of the target WLAN AP, as in block 1310. The method can further comprise communicating, from the UE, a measurement report to the eNode B of the targeted WLAN AP that includes information of the selected measurements, as in block 1320. The method can further comprise receiving, at the UE, data traffic steering command information from the eNode B, wherein the data traffic steering command information indicates a WLAN AP for the UE to direct data traffic to, as in block 1330.

In one embodiment, the method can further comprise communicating, to the eNode B, an acknowledgement message from the UE indicating the UE has received a steering command from the eNode B. In another embodiment, the data traffic steering command information for a UE can be in a radio resource control (RRC) connected state or a cell dedicated channel (DCH) state and the UE can be controlled by a network element in the communications network using dedicated traffic steering commands. In another embodiment, the network element can be an open mobile alliance device manager (OMA DM), an operations, administration and maintenance (OAM) network manager (NM), an eNode B, or a radio network controller (RNC). In another embodiment, the dedicated traffic steering commands can be based on the selected measurements of the WLAN AP. In another embodiment, the method can further comprise the UE receiving, from the eNode B, WLAN AP identification (ID) information identifying a selected WLAN AP based on the measurement control information to take selected measurements of and the UE taking the selected measurements of the selected WLAN AP for the measurement report. In another embodiment, the target WLAN AP can be identified based on a status of one or more WLAN APs.

Figure 14:
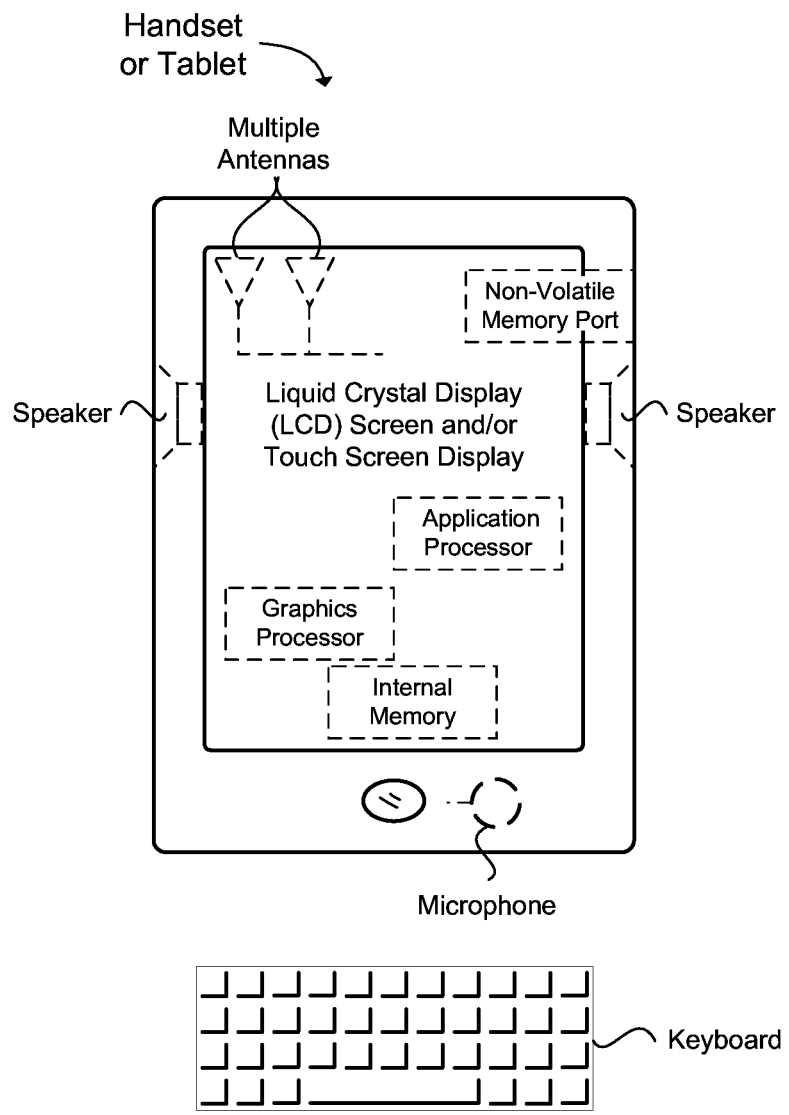
FIG. 14 illustrates a diagram of a UE in accordance with an example.

FIG. 14 provides an example illustration of the wireless device, such as a user equipment (UE), a mobile station (MS), a mobile wireless device, a mobile communication device, a tablet, a handset, or other type of wireless device. The wireless device can include one or more antennas configured to communicate with a node or transmission station, such as a base station (BS), an evolved Node B (eNB), a baseband unit (BBU), a remote radio head (RRH), a remote radio equipment (RRE), a relay station (RS), a radio equipment (RE), a remote radio unit (RRU), a central processing module (CPM), or other type of wireless wide area network (WWAN) access point. The wireless device can be configured to communicate using at least one wireless communication standard including 3GPP LTE, WiMAX, High Speed Packet Access (HSPA), Bluetooth, and Wi-Fi. The wireless device can communicate using separate antennas for each wireless communication standard or shared antennas for multiple wireless communication standards. The wireless device can communicate in a wireless local area network (WLAN), a wireless personal area network (WPAN), and/or a WWAN.

FIG. 14 also provides an illustration of a microphone and one or more speakers that can be used for audio input and output from the wireless device. The display screen can be a liquid crystal display (LCD) screen, or other type of display screen such as an organic light emitting diode (OLED) display. The display screen can be configured as a touch screen. The touch screen can use capacitive, resistive, or another type of touch screen technology. An application processor and a graphics processor can be coupled to internal memory to provide processing and display capabilities. A non-volatile memory port can also be used to provide data input/output options to a user. The non-volatile memory port can also be used to expand the memory capabilities of the wireless device. A keyboard can be integrated with the wireless device or wirelessly connected to the wireless device to provide additional user input. A virtual keyboard can also be provided using the touch screen.

Various techniques, or certain aspects or portions thereof, can take the form of program code (i.e., instructions) embodied in tangible media, such as floppy diskettes, CD-ROMs, hard drives, non-transitory computer readable storage medium, or any other machine-readable storage medium wherein, when the program code is loaded into and executed by a machine, such as a computer, the machine becomes an apparatus for practicing the various techniques. In the case of program code execution on programmable computers, the computing device can include a processor, a storage medium readable by the processor (including volatile and non-volatile memory and/or storage elements), at least one input device, and at least one output device. The volatile and non-volatile memory and/or storage elements can be a RAM, EPROM, flash drive, optical drive, magnetic hard drive, or other medium for storing electronic data. The base station and mobile station can also include a transceiver module, a counter module, a processing module, and/or a clock module or timer module. One or more programs that can implement or utilize the various techniques described herein can use an application programming interface (API), reusable controls, and the like. Such programs can be implemented in a high level procedural or object oriented programming language to communicate with a computer system. However, the program(s) can be implemented in assembly or machine language, if desired. In any case, the language can be a compiled or interpreted language, and combined with hardware implementations.

It should be understood that many of the functional units described in this specification have been labeled as modules, in order to more particularly emphasize their implementation independence. For example, a module can be implemented as a hardware circuit comprising custom VLSI circuits or gate arrays, off-the-shelf semiconductors such as logic chips, transistors, or other discrete components. A module can also be implemented in programmable hardware devices such as field programmable gate arrays, programmable array logic, programmable logic devices or the like.

Modules can also be implemented in software for execution by various types of processors. An identified module of executable code can, for instance, comprise one or more physical or logical blocks of computer instructions, which can, for instance, be organized as an object, procedure, or function. Nevertheless, the executables of an identified module need not be physically located together, but can comprise disparate instructions stored in different locations which, when joined logically together, comprise the module and achieve the stated purpose for the module.

Indeed, a module of executable code can be a single instruction, or many instructions, and can even be distributed over several different code segments, among different programs, and across several memory devices. Similarly, operational data can be identified and illustrated herein within modules, and can be embodied in any suitable form and organized within any suitable type of data structure. The operational data can be collected as a single data set, or can be distributed over different locations including over different storage devices, and can exist, at least partially, merely as electronic signals on a system or network. The modules can be passive or active, including agents operable to perform desired functions.

Reference throughout this specification to "an example" means that a particular feature, structure, or characteristic described in connection with the example is included in at least one embodiment of the present invention. Thus, appearances of the phrases "in an example" in various places throughout this specification are not necessarily all referring to the same embodiment.

As used herein, a plurality of items, structural elements, compositional elements, and/or materials can be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present invention can be referred to herein along with alternatives for the various components thereof. It is understood that such embodiments, examples, and alternatives are not to be construed as defacto equivalents of one another, but are to be considered as separate and autonomous representations of the present invention.

Furthermore, the described features, structures, or characteristics can be combined in any suitable manner in one or more embodiments. In the following description, numerous specific details are provided, such as examples of layouts, distances, network examples, etc., to provide a thorough understanding of embodiments of the invention. One skilled in the relevant art will recognize, however, that the invention can be practiced without one or more of the specific details, or with other methods, components, layouts, etc. In other instances, well-known structures, materials, or operations are not shown or described in detail to avoid obscuring aspects of the invention.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

What is claimed is:

1. A user equipment (UE) operable to select a radio node in a cell of a multiple radio access technology (multi-RAT) communications network, the UE having circuitry configured to:
    determine when to offload data traffic of the UE to a wireless local area network (WLAN) access point (AP) in the multi-RAT communications network based on radio access network (RAN) assistance information communicated via the operations, administration and maintenance (OAM) system;
    identify a status of one or more WLAN APs in the multi-RAT communications network using the RAN assistance information;
    select a radio node in the cell of the multi-RAT communications network for communication based on select criteria: wherein the status of the one or more WLAN APs is an online status, an offline status, coupled to an internet connection status, a congested status, or a non-congested status;
    direct data traffic of the UE to a wireless wide area network (WWAN) node:
        when the status of the one or more WLAN APs is the offline status or the congested status;
        when no WLAN APs are located in the cell of the communications network; and
        when the UE has not received RAN assistance information from a RAN.

2. The circuitry of claim 1, wherein the radio node is a wireless wide area network (WWAN) node or a WLAN AP.

3. The circuitry of claim 1, wherein the select criteria is a status of the one or more WLAN APs.

4. The circuitry of claim 1, wherein the OAM system includes at least one of a WLAN domain manager (DM) element manager (EM), a WLAN network manager (NM), and a WWAN DM EM.

5. The circuitry of claim 3, further configured to select a WLAN AP of the one or more WLAN APs to offload data traffic based, at least in part, on the status of the one or more WLAN APs.

6. The circuitry of claim 1, wherein:
the online status of the WLAN AP indicates that the WLAN AP is actively transmitting data or actively receiving data; and
the offline status of the WLAN AP indicates that the WLAN AP is not actively transmitting data or not actively receiving data.

7. The circuitry of claim 1, further configured to determine to offload data traffic of the UE to a selected WLAN AP when the status of the one or more WLAN APs is the online status and the non-congested status.

8. The circuitry of claim 1, further configured to select a WLAN AP of the one or more WLAN APs to offload data traffic based, at least in part, on using the RAN assistance information.

9. The circuitry of claim 1, further configured to receive RAN assistance information from a RAN via broadcast signaling or dedicated signaling.

10. The circuitry of claim 1, further configured to:
receive WLAN measurements and WLAN information from the one or more WLAN APs;
obtain an offload policy:
from an access network discovery and selection function (ANDSF) module;
via an open mobile alliance device management (OMA-DM) procedure; or
pre-configured at the UE; and
select a WLAN AP of the one or more WLAN APs to offload data traffic based, at least in part, on the WLAN measurements, WLAN information, and the offload policy.

11. An evolved node B (eNode B) operable to determine when a user equipment (UE) offloads data traffic to a wireless local area network (WLAN) node in a cell of a communications network, the eNode B having circuitry configured to:
receive, from a WLAN access point (AP) via a network manager (NM) of the communications network, a WLAN AP status report indicating a status of one or more WLAN APs in the cell;
communicate, to the UE, measurement control information identifying a target WLAN AP based on the status of the one or more WLAN APs for the UE to take selected measurements of the targeted WLAN AP;
receive, from the UE, a measurement report of the targeted WLAN AP that includes information of the selected measurements;
communicate a steering command to the UE, wherein the steering command indicates a radio node for the UE to direct selected data traffic to;
determine a number of WLAN APs within the cell of a communications network;
compile a list of WLAN APs available for offloading in the cell of the communications network;
remove a selected WLAN AP from the list of available WLAN APs when the status of the selected WLAN AP changes to an offline status;
remove the selected WLAN AP from the list of available WLAN APs when the status of the selected WLAN AP changes to a congested status;
add a WLAN AP to the list of available WLAN APs when the status of the selected WLAN AP changes to an online status; and
add a WLAN AP to the list of available WLAN APs when the status of the selected WLAN AP changes to a non-congested status.

12. The circuitry of claim 11, wherein the radio node is a wireless wide area network (WWAN) node or a WLAN AP.

13. The circuitry of claim 11, wherein the steering command is based on the measurement report from the UE.

14. The circuitry of claim 11, further configured to:
receive WLAN AP information from an operations, administration and maintenance (OAM) interface; and
determine an availability of one or more WLAN APs using the WLAN AP information of each of the one or more WLAN APs.

15. The circuitry of claim 14, wherein the WLAN AP information includes an identifier of the WLAN AP, media access control (MAC) specifications and physical layer (PHY) specifications of the WLAN AP, a radio frequency parameter of the WLAN AP, state information of the WLAN AP, a location of the WLAN AP, or traffic load information of the WLAN AP.

16. The circuitry of claim 15, wherein the identifier of the WLAN AP is a service set identification (SSID), a basic SSID (BSSID), a roaming consortium list according to an Institute of Electronics and Electrical Engineers (IEEE) 802.11u hotspot 2.0 (HS2.0) standard, a network address identifier (NAI) realm list according to an IEEE 802.11u HS2.0 standard, or a domain name list using fully qualified domain names (FQDN) according to an IEEE 802.11u HS2.0 standard.

17. The circuitry of claim 15, wherein the radio frequency parameter of the WLAN AP is a frequency band or a channel band of the WLAN AP used for communicating data.

18. The circuitry of claim 11, further configured to identify the targeted WLAN AP for the UE to take selected measurements based on a status of the one or more WLAN APs.

19. A product including a non-transitory storage medium having stored thereon instructions that are adapted to be executed to implement a method of selecting a wireless local access network (WLAN) access point (AP) in a communications network to offload data traffic of a user equipment (UE), the method comprising:
receiving, at the UE, measurement control information from an evolved node B (eNode B) identifying a target WLAN AP for the UE to take selected measurements of the target WLAN AP;
communicating, from the UE, a measurement report to the eNode B of the targeted WLAN AP that includes information of the selected measurements; and
receiving, at the UE, data traffic steering command information from the eNode B, wherein the data traffic steering command information indicates a WLAN AP for the UE to direct data traffic to, wherein a status of the target WLAN AP is an online status, an offline status, coupled to an internet connection status, a congested status, or a non-congested status, such that data traffic of the UE is directed to a wireless wide area network (WWAN) node:
when the status of the one or more WLAN APs is the offline status or the congested status;

when no WLAN APs are located in the cell of the communications network; and when the UE has not received RAN assistance information from a RAN.

20. The product of claim 19, wherein the method further comprises communicating, to the eNode B, an acknowledgement message from the UE indicating the UE has received a steering command from the eNode B.

21. The product of claim 19, wherein:

the data traffic steering command information for a UE is in a radio resource control (RRC) connected state or a cell dedicated channel (DCH) state; and the UE is controlled by a network element in the communications network using dedicated traffic steering commands.

22. The product of claim 19, wherein the network element is an open mobile alliance device manager (OMA DM), an operations, administration and maintenance (OAM) network manager (NM), an eNode B, or a radio network controller (RNC).

23. The product of claim 19, wherein the dedicated traffic steering commands are based on the selected measurements of the WLAN AP.

24. The product of claim 19, wherein the method further comprises:

the UE receiving, from the eNode B, WLAN AP identification (ID) information identifying a selected WLAN AP based on the measurement control information to take selected measurements of; and the UE taking the selected measurements of the selected WLAN AP for the measurement report.

25. The product of claim 19, wherein the target WLAN AP is identified based on a status of one or more WLAN APs.

* * * * *